US009021708B2

(12) United States Patent
Rabiner et al.

(10) Patent No.: US 9,021,708 B2
(45) Date of Patent: May 5, 2015

(54) SYSTEMS AND METHODS FOR SAILBOAT MAST ALIGNMENT

(71) Applicants: Robert A. Rabiner, Tiverton, RI (US); Daniel E. Rabiner, Tiverton, RI (US)

(72) Inventors: Robert A. Rabiner, Tiverton, RI (US); Daniel E. Rabiner, Tiverton, RI (US); Raoul I. Rabiner, Perth Amboy, NJ (US)

(*) Notice: Subject to any disclaimer, the term of this patent is extended or adjusted under 35 U.S.C. 154(b) by 0 days.

(21) Appl. No.: 14/271,757

(22) Filed: May 7, 2014

(65) Prior Publication Data

US 2014/0237831 A1    Aug. 28, 2014

Related U.S. Application Data

(63) Continuation of application No. 13/441,188, filed on Apr. 6, 2012, now Pat. No. 8,756,822.

(51) Int. Cl.
*G01B 11/27* (2006.01)
*B63B 15/00* (2006.01)

(52) U.S. Cl.
CPC ............... *G01B 11/27* (2013.01); *B63B 15/00* (2013.01); *Y10S 33/21* (2013.01)

(58) Field of Classification Search
CPC .. G01C 15/004; G01C 15/008; G01C 15/105; G01C 25/00; G01C 15/002; G01C 15/00; G01B 11/27; G01B 11/275
USPC .................................... 33/228, 286, DIG. 21
See application file for complete search history.

(56) References Cited

U.S. PATENT DOCUMENTS

| | | |
|---|---|---|
| 5,383,524 A | 1/1995 | Rinnemaa |
| 6,052,911 A | 4/2000 | Davis |
| 6,301,997 B1 | 10/2001 | Welte |
| 6,385,856 B1 | 5/2002 | Godin |
| 6,532,676 B2 | 3/2003 | Cunningham |
| 6,718,644 B1 | 4/2004 | Perkins et al. |
| 6,823,601 B2 | 11/2004 | Murray |
| 6,891,148 B1 | 5/2005 | Rivera et al. |
| 6,894,771 B1 | 5/2005 | Dorrance et al. |
| 7,089,776 B2 | 8/2006 | Dale, Jr. |
| 7,299,560 B2 | 11/2007 | Diaz et al. |
| 7,382,913 B2 | 6/2008 | Dorranc et al. |
| 7,424,387 B1 | 9/2008 | Gill et al. |
| 7,748,127 B1 | 7/2010 | Cosimano |
| 7,984,557 B1 | 7/2011 | Carl |
| RE42,888 E | 11/2011 | Crick |
| 8,244,024 B2 | 8/2012 | Dorrance et al. |
| 8,567,077 B2 * | 10/2013 | Wernig et al. ............... 33/286 |
| 8,756,822 B2 * | 6/2014 | Rabiner et al. ............... 33/286 |
| 2003/0098972 A1 | 5/2003 | McMillan et al. |

(Continued)

OTHER PUBLICATIONS

Farr 40 One-Design, Tuning Guide, North Sails, http://222.vossas-sociates.com/farr40/northtg.pdf, 1998.

(Continued)

*Primary Examiner* — Yaritza Guadalupe-McCall
(74) *Attorney, Agent, or Firm* — Greenberg Traurig, LLP; David J. Dykeman; Roman Fayerberg

(57) ABSTRACT

Systems and methods for sailboat mast alignment are provided. In some embodiments, a system for alignment of a sailboat mast comprises a mounting bracket configured for attachment to the mast, and one or more lasers pivotally connected to the mounting bracket to enable the one or more lasers to be positioned at an index angle relative to the mast on both sides of the mast.

20 Claims, 10 Drawing Sheets

(56) References Cited

U.S. PATENT DOCUMENTS

| | | |
|---|---|---|
| 2011/0139056 A1 | 6/2011 | Cholley et al. |
| 2013/0074348 A1 | 3/2013 | Hunze |
| 2013/0097880 A1* | 4/2013 | Wernig et al. ............... 33/228 |
| 2013/0110314 A1 | 5/2013 | Stieff |
| 2013/0263459 A1 | 10/2013 | Rabiner et al. |

OTHER PUBLICATIONS

Laser Go-Fast Tip #1: Read This Rigging Guide First, Dinghy Shop, Amityville, New York, http://www.dinghyshop.com/sailboat/Laserperformance/laser_4_7/laser-rigging-guide.pdf.

Mast Assembly Manual for J-105, Mast Tuning, http://www.j105fleet3.org/files/knowledge/Hall%20Mast%20Install.pdf.

Basic Mast Tuning for Sailboats typically found on Lake Nockamixon, Captain Mike Brown, http://www.comoltd-internet.info/mast%20tuning.pdf.

Mast Tuning, reprinted from C&C Owners' Manual—Jun. 30, 1976 http://www.cncphotoalbum.com/doityourself/masttuning/tuning.htm.

Office Action in U.S. Appl. No. 13/441,188 mailed Jan. 9, 2014.

Office Action in U.S. Appl. No. 13/441,188 mailed Feb. 24, 2014.

* cited by examiner

SYSTEMS AND METHODS FOR SAILBOAT MAST ALIGNMENT

RELATED APPLICATIONS

This application is a continuation Application of U.S. application Ser. No. 13/441,188, filed on Apr. 6, 2012, now U.S. Pat. No. 8,756,822, the entirety of which is hereby incorporated herein by reference for the teachings therein.

FIELD

The embodiments disclosed herein relate to methods and systems for mast alignment in a sail boat, and more particularly to methods and systems utilizing one or more lasers or other light amplified methods and means for projecting an image on the mast or from the mast which serves as a guide for mast alignment.

BACKGROUND

A primary object of sailboat mast alignment is to obtain a straight (side to side) mast column under sailing loads, so that the mast provides a uniform column to the aerodynamic foil (the sail) when compared between port tack and starboard tack, as well as to ensure that the mast column is centered in the sailboat. The means of sailboat mast alignment remain unchanged since at least the 1960s. Typical methods of alignment involve swinging a tape or string from side to side and measuring the length between a point on the mast and reference points at the same distance from the mast. Thereafter—the entire process of alignment of the mast under dynamic loads is one of visual determination, approximation and often results in an inaccurate measurements.

While some yachts, such as those that race in the America's Cup, as well as mega yachts, have established the use of mast mounted cameras to look at sail shapes, the concept of an inexpensive and relatively quick method towards a complete alignment and tuning of a mast under both static and dynamic loads has not been heretofore constructed.

SUMMARY

Systems and methods for sailboat mast alignment are provided. According to aspects illustrated herein, there is provided a system for alignment of a sailboat mast that includes a mounting bracket configured for attachment to the mast, and one or more lasers pivotally connected to the mounting bracket to enable the one or more lasers to be positioned at an index angle relative to the mast on both sides of the mast.

According to aspects illustrated herein, there is provided a system for alignment of a sailboat mast that includes a sailboat mast having a bottom end and a top end, a laser mounted to the mast at a first height, a beam splitter mounted at a second height closer to the bottom end of the mast than the first height, the beam splitter is positioned in alignment with the laser to split a laser beam emitted by the laser into multiple beams symmetrical relative to the mast.

According to aspects illustrated herein, there is provided a method for alignment of a sailboat mast that includes positioning one or more laser in proximity to a mast, providing with the one or more lasers one or more reference beams relative to the mast, and aligning the mast according to the reference beams.

BRIEF DESCRIPTION OF THE DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1:
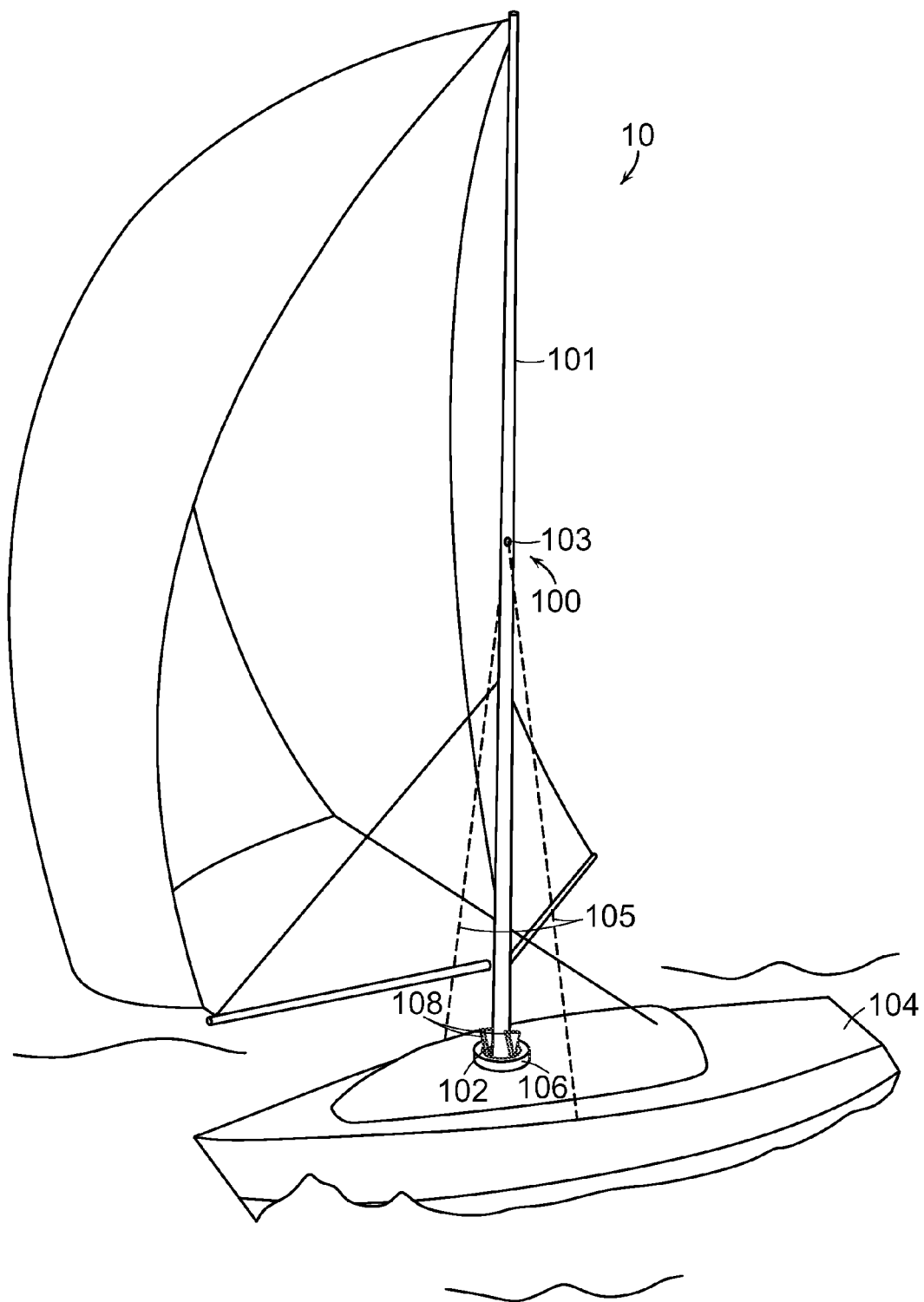
FIG. 1 shows a perspective view of a sailboat equipped with a system for mast alignment of the present disclosure
Figure 2:
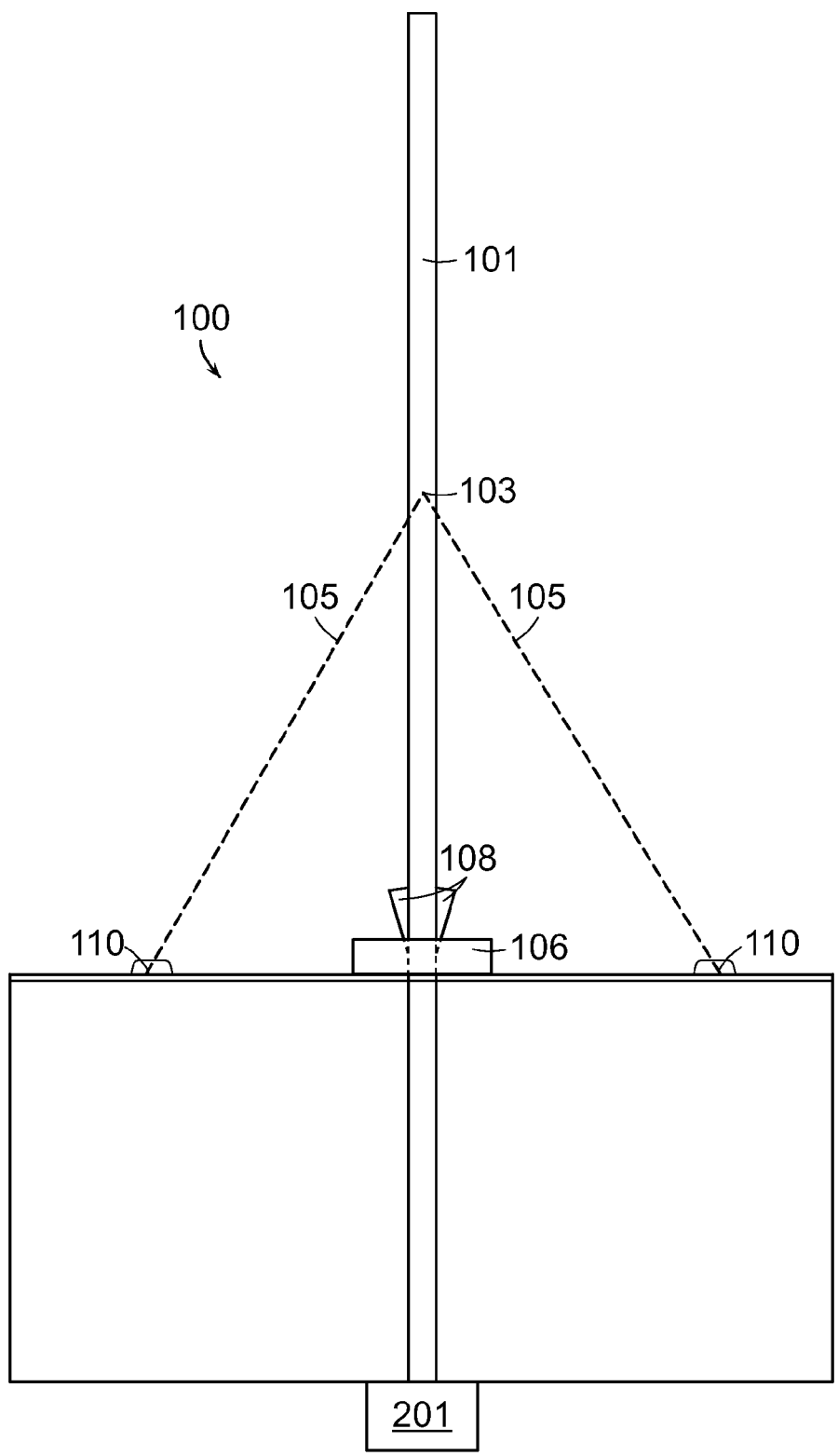
FIG. 2 shows an embodiment of a system for mast alignment of the present disclosure using a single laser beam.

The embodiments disclosed herein relate to methods and systems for mast alignment or mast tuning. As shown in FIG. 1, a sailboat 10 has a mast 101 and is equipped with a system for mast alignment 100 of the present disclosure disposed on the mast 101. As shown in FIG. 1 and FIG. 2, in some embodiments, the system for mast alignment 100 of the present disclosure includes one or more lasers 103 that can be mounted to the mast 101 and, optionally, optical targets to assist in the visualization of the laser beam 105. The one or more lasers 103 project an image on the mast 101 or from the mast 101 onto the deck 104 of the sailboat 10 to provide a guide for mast alignment 100.

In some embodiments, one of the goals of mast alignment 100 is to ensure that the mast 101 is centered at deck level from side to side. Alignment from front to back is typically not a concern because that adjustment can be made while sailing to adjust shape of the sail. Nevertheless, the systems and methods disclosed herein can be also used to align the mast front to back.

In some embodiments, the system for mast alignment 100 optically distinguishes any part of the mast 101 (vertically) and the position therein. In some embodiments, the system for mast alignment 100 quantifies the position of the mast 101 under dynamic loading characteristics. In some embodiments, the system for mast alignment 100 has optical means to define the position of the mast 101 in space from a position other than that of directly below, and in line with, the mast 101. In some embodiments, the system for mast alignment 100 has a mounting bracket to mount multiple lasers 103 to allow the inspection of the entire mast 101 under dynamic loads, as quantified by deflection and as observed by a vernier and illumination dot. In some embodiments, the system for mast alignment 100 allows to tune a mast 101 in absence of daylight. In some embodiments, the system for mast alignment 100 allows to quantify deflection, wherein knowledge of the mast height, the change in angle as defined by the movement of the illumination spot, and the change in angle noted by the vernier, allows trigonometry to quantify the change and thereby produce an absolute measurement of the position change of the mast 101. In some embodiments, the optical target encircles the mast 101, such that irregular shapes and abutments off the mast 101 can be measured to provide an actual deflection and alignment of the mast 101. In some embodiments, the system for mast alignment 100 can be used on various sized yachts and corresponding masts and riggings. In some embodiments, the laser 103 illuminates targets of mast heights up to 225 feet. In some embodiments, the laser 103 illuminates targets exceeding mast heights of 225 feet. In some embodiments, the system for mast alignment 100 defines the true center of the yacht with respect to mast position. In some embodiments, the system for mast alignment 100 enables reproducible settings to achieve a centered and straight mast 101. In some embodiments, the system for mast alignment 100 enables a method for tuning of the mast 101 wherein one person adjusts the rigging, a second person defines the position of the mast 101, and a third person adjusts and trims the sails. In some embodiments, the system for mast alignment 100 enables a method for short-handed tuning of the mast 101 wherein one person adjusts the rigging and defines the position of the mast 101, and a second person adjusts and trims the sails. In some embodiments, the system for mast alignment 100 enables to place optical illumination spots on the mast 101 so as to further view and refine the position of the spot by grid marks on the illumination target. In some embodiments, the system for mast alignment 100 enables to quantify the amount of bend, or rake, in the mast 101 so as to replicate trim and running rigging adjustments while sailing on different tacks. In some embodiments, the system for mast alignment 100 illuminates a spot on a mast from a distance without a need to expand the optical target so that the optical target is not so large as to negate the measurement and/or optical position qualities of the optical target. In some embodiments, the system for mast alignment 100 defines a "position in space" where a mast tip should be, such as in the case of fractional rigged boats, in a location where the mast head typically falls way off to leeward (as the mast head to provide a visual guide to align the mast 101.

In reference to FIG. 1 and FIG. 2, in a typical sailboat 10, the mast 101 sits on a base on the top of the keel 201, which presumably is in the middle of the sailboat 10. A cut-out 102 is made in the deck 104 of the sailboat 10 and a frame 106, known as a mast collar, is attached to the deck 104 around the cut-out 102 to provide a suitable interface where the mast 101 exits from the cut-out 102 in the deck 104. In some embodiments, where the mast collar 106 is somewhat larger than the mast 101 to allow the mast 101 to be inserted through the collar 106 and/or the location of the mast collar 106 is in the same plane as the stays and shrouds (lines that exit the mast and provide lateral support to the mast), the mast 101 may need to be supported at the mast collar 106 to prevent the mast 101 from moving athwartships in the mast collar 106 (side to side). In some embodiments, the mast 101 is supported in the mast collar 106 by the placement of wedges 108, chocks or other filling materials to create a solid and stable surrounding for the mast 101 in the mast collar 106.

While the process is to center the mast 101 in the mats collar 106, the assumption that the center of the mast collar 106 is in fact the center of the sailboat 10 is the basis for cumulative alignment errors. By centering the mast 101 in the center of the sailboat 10, a determination defined by position as related to the sides of the hull which is presumed to be fair and true on either side of the hull, the mast alignment 100 is positioned approximately, irrespective of the collar 106 space. By the establishment of the base of the mast 101 on the centerline of the keel 201, which is presumed to be the middle of the sailboat 10, and the establishment of the deck position of the mast 101 similarly aligned in the middle of the sailboat 10 in the mast collar 106, two points of alignment have been established and the extension of that line upwards would result in a straight column. In some embodiments, when aligning the mast, the following assumptions may be made: (i) the cut-out 102 is correct; (ii) the mast collar 106 is evenly constructed, and (iii) the alignment of the mast collar 106 as mounted to the deck 104 is even. The mast 101 is then mounted in the middle of the sailboat 10, although this is rarely the case.

Referring to FIG. 2, to align the mast 101, one or more lasers 103 are attached to the mast 101 at a pre-determined distance from the deck 104. It should be noted that the term "laser" as used herein encompasses any device that emits light (electromagnetic radiation) such as through a process of optical amplification or a similar process. In some embodiments, the height of the laser attachment is selected to ensure that the user can conveniently operate the system. In some embodiments, the one or more lasers 103 are positioned at a height that prevents a shallow incidence angle α, i.e. about 80 degrees, such that the spot on the deck 104 is not elongated and/or negatively affected by slight differences in deck height. The term "incidence angle" as used herein refers to the angle between the laser beam 105 and the mast 101. In some embodiments, the one or more lasers 103 are positioned at a height such that the incident angle α is between about 30 and 60 degrees. In some embodiments, the height of the laser 103 will also depend on the width of the sailboat 10. In some embodiments, the attachment point for the laser 103 is on the mast 101 in a position that is above the boom of the sailboat 10.

In some embodiments, the laser 103 directs a laser beam 105 to an optical target point 110 located at a predetermined distance from the mast 101 to provide guidelines for centering the mast 101 relative to the deck 104 of the sailboat 10. In some embodiments, the mast 101 is tuned from side to side until the laser beam 105 hits the optical target point 110, which indicates that the mast 101 is centered from side to side relative to the sailboat 10. The optical target point 110 may be a reflector, a reflective paint mark or similar as long as the optical target point 110 can assist in the visualization of the laser beam 105. In some embodiments, the optical targets 110 are 3 m reflective tapes. In some embodiments, the optical targets 110 are burnished mirrors to cause a flare of laser light. In some embodiments, the optical targets 110 include alignment stripes or mars, optionally in a different, alternating color. In some embodiments, the optical targets 110 reflect or flash in a different pattern along their length so as to make the process of determining where the illuminated laser point is much easier. In some embodiments, the optical targets 110 include a reflective tape with ridges running across the tape that change the reflective pattern and can provide that feedback to the user to make the illumination of acute angles possible. For example, due to the position of the laser 103 on the mast 101, the laser 103 may need to illuminate optical targets disposed on the sides of the mast 101 at an acute angle.

In some embodiments, the optical targets 110 are positioned at the intersection of the hull and deck 104 on each side of the sailboat 10. In some embodiments, the optical target points 110 are located on the deck 104 on each side of the mast 101 and at the same distance from the mast 101. In some embodiments, the laser 103 emits a green light beam for maximum visibility in sun. In some embodiments, the laser 103 may emit a red, blue, or other color light beam as long as the light beam is visible to the naked eye. In some embodiments, the laser 103 is of a frequency and power such that it is not destructive. In some embodiments, the laser 103 is powered by between 0.5 watts and 0.75 watts.

The one or more lasers 103 may be mounted to the mast 101 in a variety of ways.

Figure 3C:
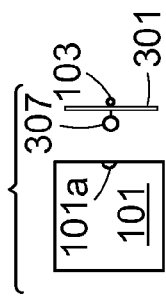
FIG. 3A, FIG. 3B, and FIG. 3C show an embodiment of mounting a laser to a mast.
Figure 3B:
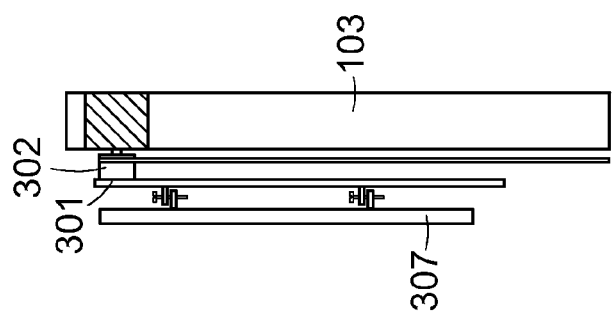
Figure 3A:
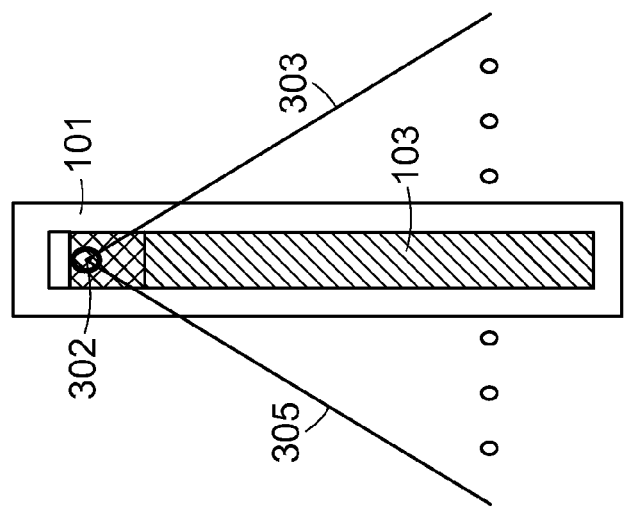

In some embodiments, as shown in FIG. 3A, the laser 103 is mounted to the mast 101 using a mounting bracket 301. In some embodiments, the mounting bracket 301 is stationary relative to the mast 101 and the laser 103 is rotatable relative to the mounting bracket 301 such that the laser 103 can swing from side to side to a predetermined location. In some embodiments, the mounting bracket 301 includes a swivel plate 302 such that the laser 103 can swing from side to side, as represented by lines 303 and 305. In some embodiments, the laser 103 is stationary relative to the mounting bracket 301 and the mounting bracket 301 is rotatable relative to the mast such that the mounting bracket 301 and the laser 103 can swing from side to side to a predetermined location In reference to FIG. 3B, and FIG. 3C, in some embodiments, the mounting bracket 301 is provided with a fitting 307 suitable for insertion into a bolt rope guide 101a of the mast 101 in order to attach the mounting bracket 301 to the mast 101. In some embodiments, the laser 103 is pivotly attached to the mounting bracket 301, such as via a swivel plate 302, to allow the laser 103 to pivot relative to the mast 101. Of course, as noted above, a swivel plate 302 may be disposed between the fitting 307 and the mounting bracket 301 to allow the mounting bracket 301 to pivot relative to the mast 101, with the laser 103 being either pivotally or fixedly attached to the mounting bracket 301. In general, the position of the laser 103 relative to the mast 101 is dependant on the width of the sailboat and the height at which the laser 103 is attached to the mast 101. In some embodiments, the laser 103 can be positioned so as to form an angle of 30, 45 or 60 degrees with the mast 101.

Although FIG. 2 and FIG. 3A, FIG. 3B, and FIG. 3C show lasers 103 positioned in immediate proximity to the mast 101, in some embodiments, the one or more lasers 103 are spaced away from the mast 101. In some embodiments, the one or more lasers 103 are positioned about 12 inches from the mast 101. Also, in some embodiments, the system for mast alignment 100 can include a laser 103 on each side of the mast 101 instead of a single laser 103 rotatable side to side.

Figure 4A:
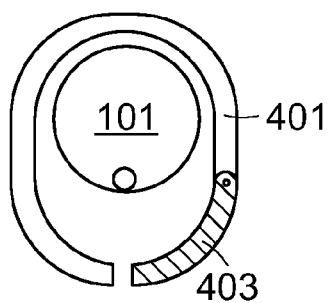
FIG. 4A, FIG. 4B, and FIG. 4C show an embodiment of mounting a laser to a mast.
Figure 4B:
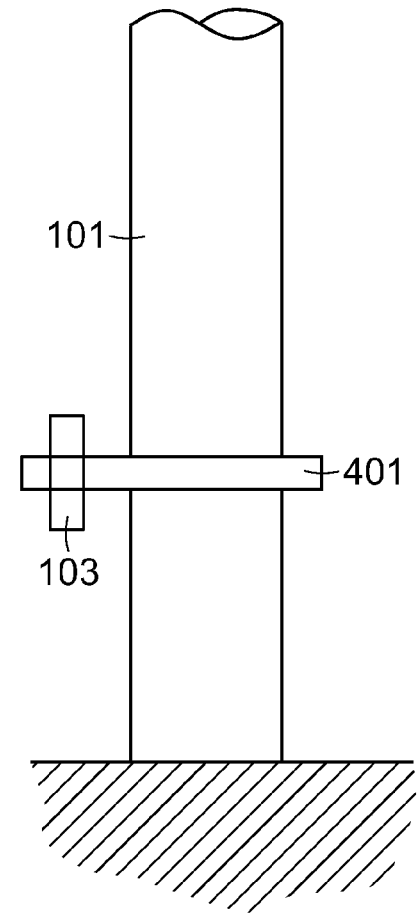

In reference to FIG. 4A, in some embodiments, the system for mast alignment 100 may include a laser track 401 for mounting one or more lasers 103 thereon and rotating the one or more lasers 103 around the mast 101 along the laser track 401. As shown in FIG. 4B, the laser track 401 is attachable to the mast 101 to create a track for one or more lasers 103 to rotate around the mast 101 such that the one or more lasers 103 can be placed at a desired location along the circumference of the mast 101. In some embodiments, the laser track 401 is U-shaped. In some embodiments, the laser track 401 is C-shaped. In some embodiments, the laser track 401 has a spacer to allow the mainsail to slide between it. In some embodiments, the laser track 401 is designed to both allow the mainsail and other control lines to be attached to the mast 101. In some embodiments, the laser track 401 includes a hinged portion 403 such that the one or more lasers 103 can be added to or removed from the laser track 401. The laser track 401 is designed to be attached to any mast 101. In some embodiments, the mast 101 may be pre-designed to incorporate the system of the present embodiment by pre-installed screw fittings for the mounting of the laser track 401.

Figure 4C:
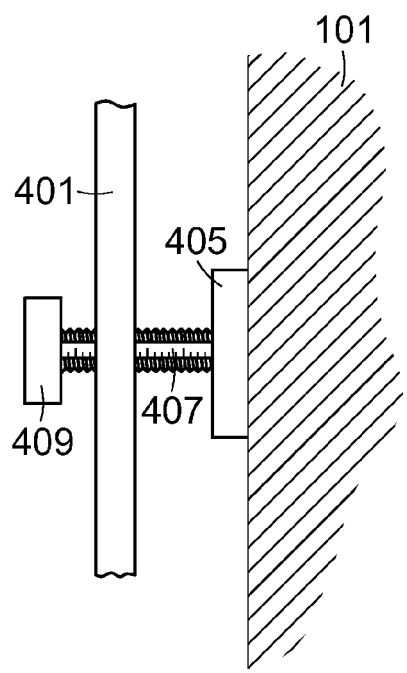

As shown in FIG. 4C, in some embodiments, the laser track 401 is attachable to the mast 101 with a compressive holding plate 405 which configures to engage the mast 101 and hold the laser track 401 in place by compression. In some embodiments, the compressive holding plate includes one or more adjustment screws 407 to be able to center the laser track 401 on the mast 101. For example, the one or more adjustment screws 407 can be used to ensure that the laser track 401 is equidistant from the rear sides and face of the mast 101. In some embodiments, the screws or other means to attach the laser track 401 to the mast 101 have verniers 409 to ensure that the laser track 401 is centered on the mast 101. In some embodiments, the angle the laser 103 forms with the mast 101 may be preset so that the user can swing the laser 103 from side to side in a pre-controlled and measured arc. In some embodiments, the angle may be preset to 30 degrees, 45 degrees, or 60 degrees. In some embodiments, the laser 103 is attached to the laser track 401 with a vernier/angle adjustment feature, so as to be allowed to both adjust the position and affix the laser 103 in a fixed position.

In some embodiments, the laser track 401 is installed and held in place in a fashion such that the laser track 401 remains in the same plane on both sides of the mast 101. In some embodiments, the laser track 401 has sufficient support such that the rear end of the laser track 401 does not deflect downwards at the far ends of the mast collar 106. In some embodiments, the laser track 401 is sufficiently large so that the lines of the sail do not get impinged and do not deflect the other side of the mast collar 106. Because the sail and/or orientation of the laser track 401 from boat to boat and the size of the laser track 401 required to accomplish the task may vary, the laser track 401 can be assembled to the size, shape and position to accommodate each users needs.

Figure 5:
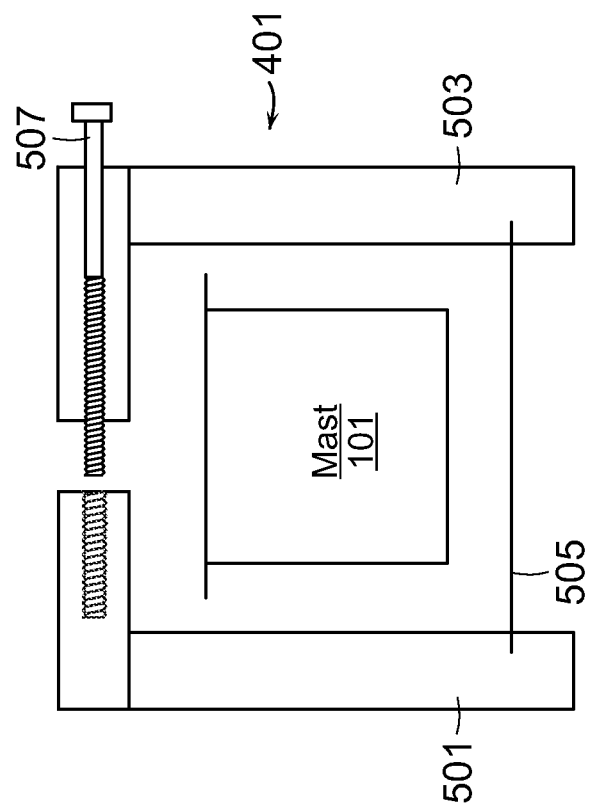
FIG. 5 shows an embodiment of mounting a laser to a mast.

In some embodiments, the laser track 401 is constructed of interlocking pieces 501, 503 of aluminum, stainless steel, carbon fiber, ABS, polycarbonate or other suitable materials, as shown in FIG. 5. In some embodiments, the laser track 401 is a three-part assembly, having a left side member 501 and a right side member 503 engageable to the left side member 501 to form a continuous track for positioning a laser 103 on either side of the mast 101. In some embodiments, the left side member 501 and right side member 503 can be held together with a set screw 507. In some embodiments, the left side member 501 and right side member 503 can be engaged on the front of the mast 101 to form a continuous track from side to side around the front of the mast 101, while the opposite (back ends) of the left side and the right sides are connected by an incremental aft stabilizing bar 505. In some embodiments, the left side member 501 and right side member 503 are configured such that when the left side member 501 and right side member 503 are engaged a continuous track is formed around the entire circumference of the mast 101.

In some embodiments, the laser track 401 has a track on it to allow for the laser 103 to be mounted on a track that can shuttle from side to side by virtue of circling the mast 101, so that the laser 103 can be moved to the opposite side of the mainsail. The laser track 401 allows the laser 103 to assume either a centered position fore and aft or to take a slightly off center position. In some embodiments, the laser 103 is attached to the laser track 401 with a shuttle bar. In some embodiments, the shuttle bar extends the distance of the laser 103 from the mast collar 106. In some embodiments, the shuttle includes a locking pin or locking mechanism to fix the position of the shuttle in the same position on the circumferential shuttle so as to allow the identical position on the shuttle to be used. This allows the user to maintain the alignment positions. In some embodiments, the pre-positioning of optical targets or optical enhancing materials allows the laser spot to be enhanced. In some embodiments, a second shuttle can be added to the mast collar 106 to work in combination with the lasers 103 on the mast 101 to align the mast 101. In some embodiments, the laser 103 is positioned on the loaded side and is not obscured by the mainsail. In some embodiments, the adjustments and visualization are performed on the loaded side of the mast 101, opposite the sail. In some embodiments, one or more lasers 103 can be provided with mounting brackets configured to attach lasers 103 to the laser track 401 and to rotate along the laser track.

Figure 6:
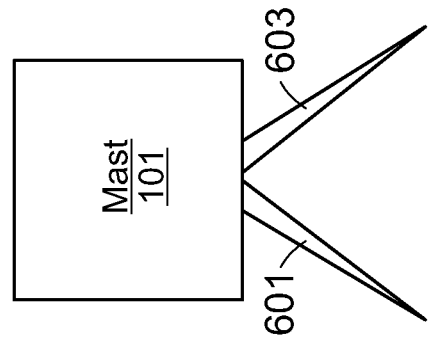
FIG. 6 shows an embodiment of mounting a laser to a mast.

In some embodiments, as shown in FIG. 6, the mast 101 is provided with two bars 601 and 603. The bars 601, 603 are positioned such that both sides of the mast 101 can be illuminated with a laser 103 mounted to the bars 601, 603. One or more lasers 103 can be attached to the bars 601, 603 by a variety of mounting brackets, including, by way of non-limiting examples various mounting brackets disclosed below.

Figure 7A:
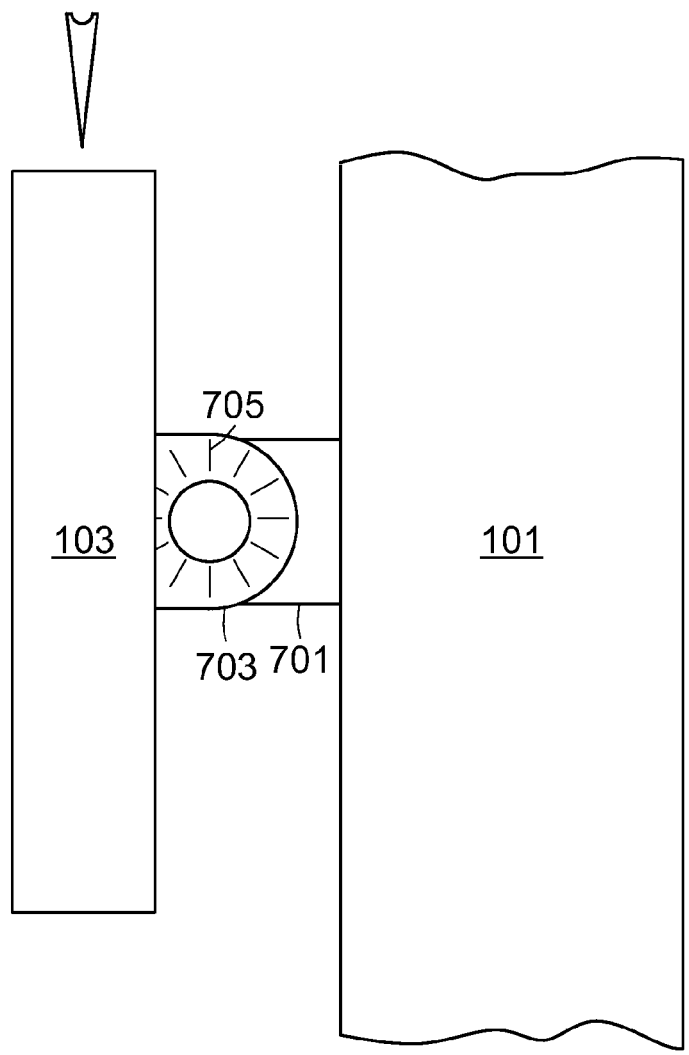
FIG. 7A, FIG. 7B, FIG. 8 and FIG. 9 show various embodiments of a system of the present disclosure utilizing a vernier for adjusting an angle of a laser on the mount.

FIG. 7A illustrates an embodiment of the mast alignment system 100 of the present disclosure. In some embodiments, the system 100 shown in FIG. 7A can aid in the fore and aft alignment position adjustment. In some embodiments, the laser 103 can be adjusted fore and aft to take into consideration a mast 101 that has been provided with a "pre-bend" such that the tip of the mast 101 is aft of the point where the laser 103 is affixed to the mast 101 and may be curved/bent in a rearward configuration.

In some embodiments, in reference to FIG. 7A, the laser 103 may be attached to the mast 101 by a mounting bracket 707 with a vernier 703 to allow the laser 103 to be set manually such as, for example, fore and aft by the user. In some embodiments, the vernier 703 provides a positive and a negative incremental angle to the laser 103 and contains a read out scale of degrees 705 to provide refinement to the angle of the laser 103.

Figure 7B:
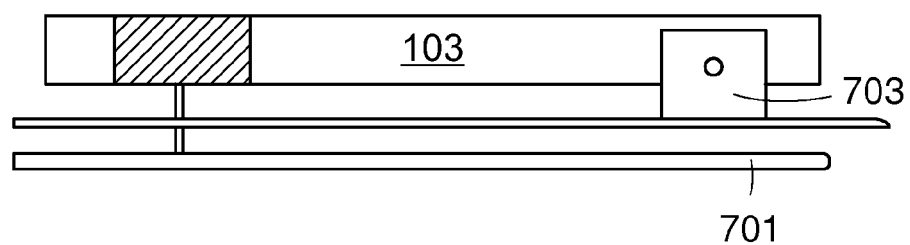

In some embodiments, as shown in FIG. 7B, a laser 103 is connected to a mounting bracket 701 such that the angle of the laser 103 relative to the mounting bracket, and consequently relative to the mast 101 upon attachment of the mounting bracket 701 to the mast 101, can be varied. The position of the laser 103 in relation to the mounting bracket 701 is controlled by a vernier 703 disposed on the mounting bracket 701 (i.e. the laser 103 is connected to and its angle is controlled by a vernier screw of the vernier 703). The mounting bracket 701 is configured for attachment to the mast 101.

In some embodiments, the mounting bracket 701 may be rotated around the mast 101 to align the mast 101 from side to side, fore and aft or both. As the laser 103 on the mounting bracket 701 is swung around the mast 101, e.g. from starboard 45 degrees to port 45 degrees, the position of the laser 103 relative to the mast 101 can be dialed in with the vernier 703 such that the laser beam 105 illuminates optical targets equidistantly-positioned on each side of the mast. If the mast 101 is misaligned, the index angle between the laser beam 105 and the mast 101 on one side will be different than the index angle on the opposing side, as defined by the number on the vernier, between the sides. By attempting to split the difference between the sides, the laser beam 105 can be aimed at where the mast tip or other portion of the mast column should be, which serves as a guide to bring the mast into alignment.

Figure 8:
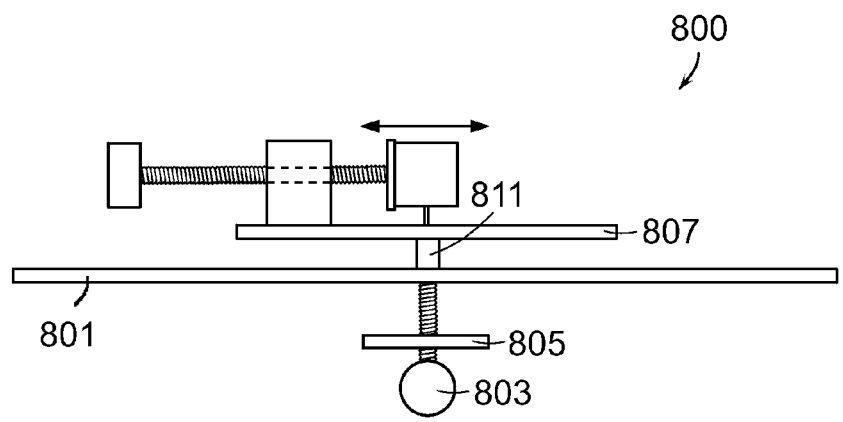

In reference to FIG. 8, a device 800 for pivotally mounting one or more lasers 103 to the mast 101 may include a mounting bracket 801, which can be provided with a bolt rope insertion fitting 803 and a compression fitting mechanism 805 for attachment to the mast 101. In some embodiments where the mainsail is attached to the mast 101 on an external track and moving slide cars, the mounting bracket 801 can be attached to the slide cars.

In some embodiments, the mounting bracket 801 is configured for attachment to the laser track 401 or bars 601, 603. On the side opposite to the bolt rope insertion fitting 803 and a compression fitting mechanism 805, the mounting bracket 801 includes a laser mounting plate 807. In some embodiments, the laser mounting plate 807 is pivotally attached to the mounting bracket 801 at a pivot point 811. In some embodiments, the position of the laser mounting plate 807 is controlled with a vernier. The device 800 may also include one or more verniers 813 attached to the laser 103 to adjust the angle of the laser 103. In some embodiments, the laser 103 is driven using a thumb screw of a vernier parallel to the laser mounting plate 807 to adjust the angle of the laser 103.

Figure 9:
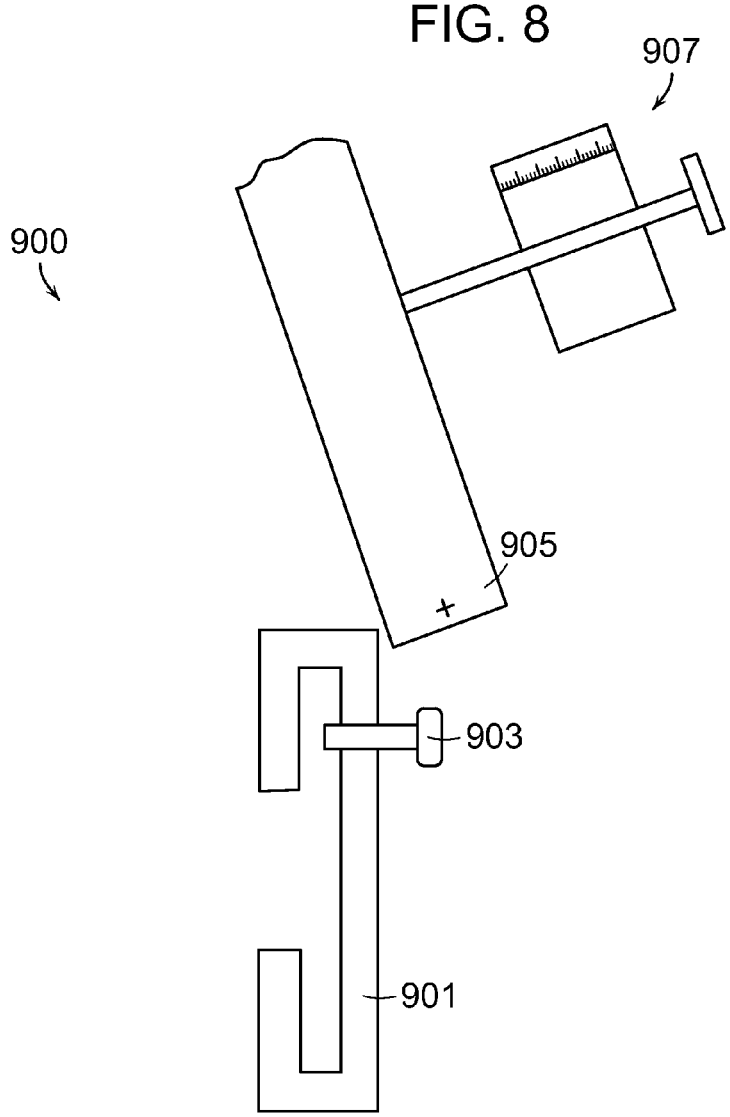

FIG. 9 illustrates yet another embodiment of a device 900 for pivotally mounting one or more lasers 103 to the mast 101. In some embodiments, the device 900 includes a mounting bracket 901 which can be attached directly or indirectly to the mast 101, as, for example, described above. In some embodiments, the mounting bracket 901 allows the laser 103 to be connected to the laser track 401 to allow the laser 103 to be rotated from side to side. In this manner, the index angle of the laser 103 is set on one side and then the laser 103 can be rotated to the other side while remaining at the pre-set angle. The mounting bracket 901 may include a spring fitting 903 to set the mounting bracket 901 in a desired location. A laser 103 is disposed on a laser mounting bracket 905 that is pivotally attached to the mounting bracket 901. The exact position of the laser 103 can be adjusted by a vernier mechanism 907.

Figure 10:
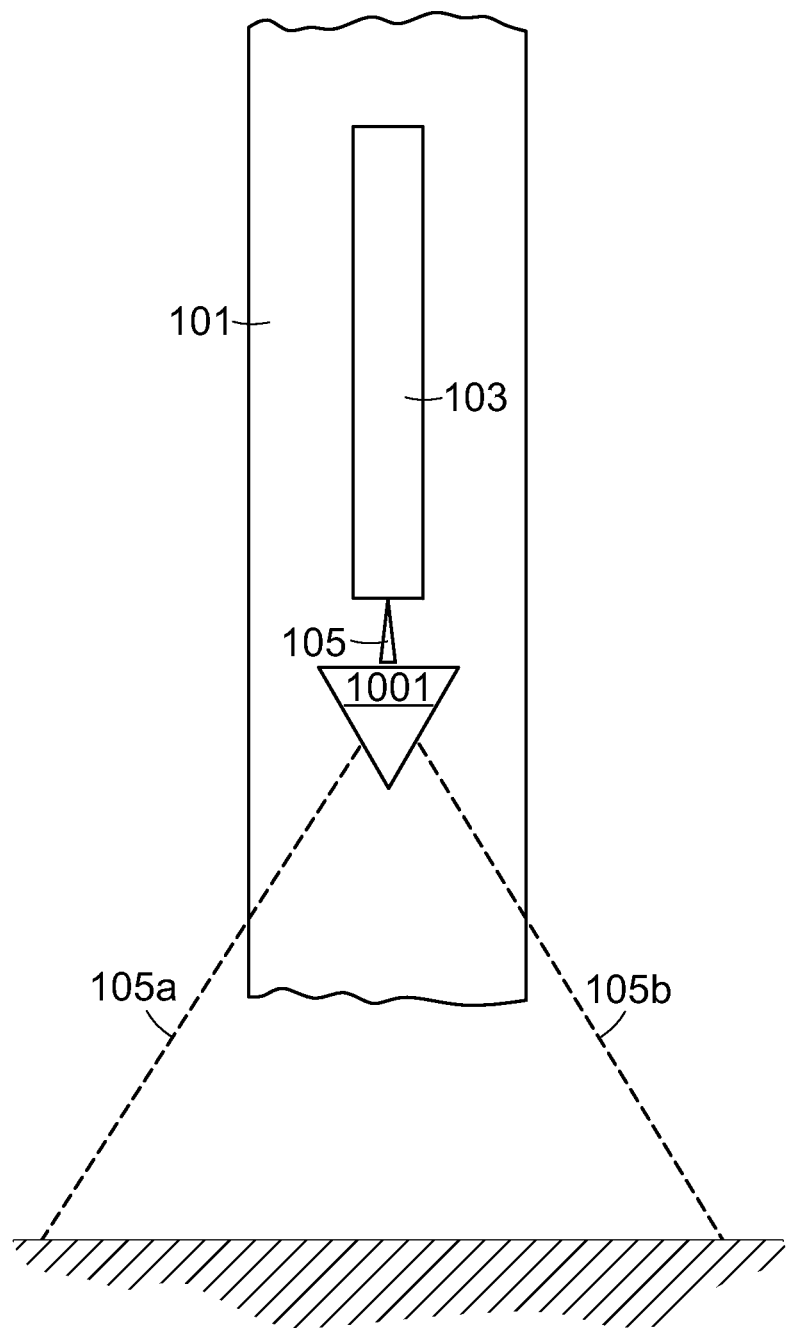
FIG. 10 shows an embodiment of the system of the present disclosure utilizing a laser beam splitter.

In reference to FIG. 10, in some embodiments, an optical splitter 1001, is affixed below the laser 103 such that the laser beam 105 from the laser 103 is equally split into two light beams 105a, 105b. In some embodiments, the optical splitter is attached to the mast 101 below the laser 103. In some embodiments, two prisms 1001 are located below the laser beam 105, with the prisms 1001 mounted on a vernier to adjust position of the prisms 1001 such that the laser beam 105 is split equally and reflected to ether side of the mast 101 toward optical targets 110 on each side of the mast 101. In some embodiments, the laser 103 is positioned along the centerline of the mast 101. In some embodiments, the laser 103 may be mounted in the track on the aft side of the mast 101 in which the sail is hoisted. The mast 101 is moved from side to side until the laser beam 105 hits the optical targets 110 positioned on each side of the mast 101, as described above.

Once the base of the mast 101 is centered as explained above, the next step is to tune to upper portion of the mast 101 into a straight column. Sailboat masts, especially those in racing sailboats, are tuned to accommodate the main sail and are typically tuned such that the masts 101 can be adjusted to cause different shapes of the sail to be yielded under different wind and sea conditions. A typical mast tuning might have a pre-bend, where the mast 101 has a pre-induced fore and aft bow to it. Such bow is adjusted and modified by stays and shrouds and other running rigging, which affects the shape of the mainsail.

Figure 11:
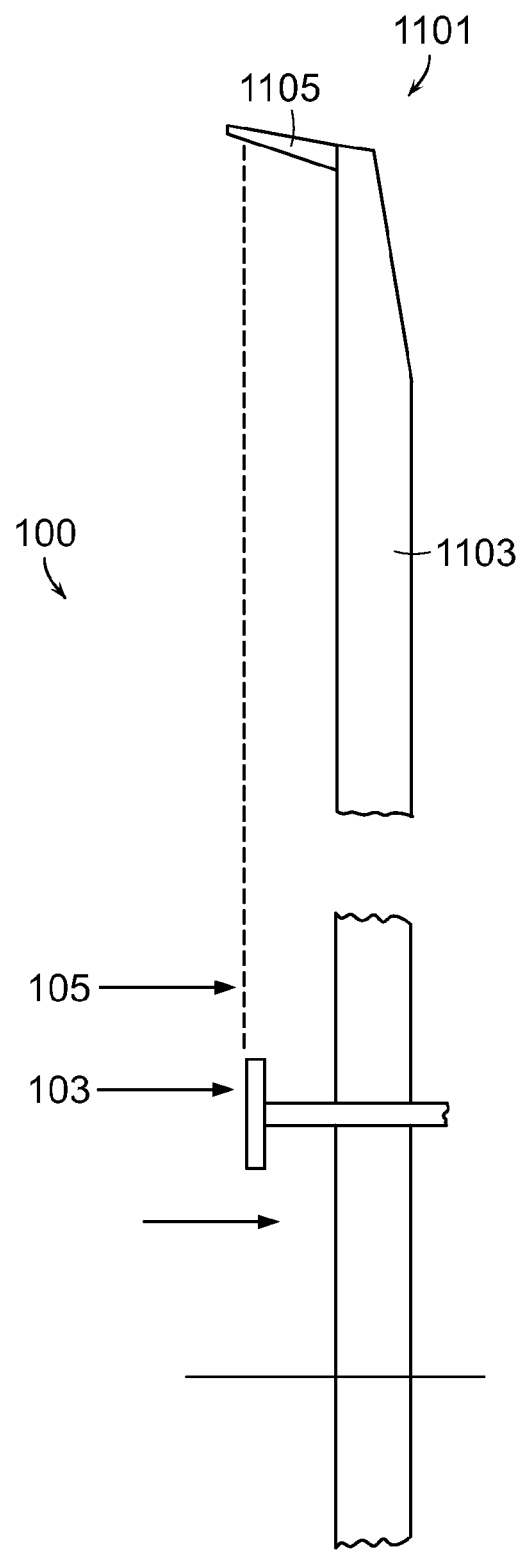
FIG. 11 and FIG. 12A, FIG. 12B, FIG. 12C, and FIG. 12D show embodiment method steps for aligning a mast using embodiment systems of the present disclosure.

As shown in FIG. 11, once the mast 101 is centered at the deck level, the tip of the mast 101 can also be centered and aligned relative to the base and mast 101 at deck level using the system for mast alignment 100 of the present disclosure. After the tip of the mast 101 is centered and aligned, the rest of the mast column 11103 can also be brought into alignment. This alignment may be described as the mast 101 standing in a smooth straight line. The end result is that the mast 101 is aligned under static load by bringing the column to intersect with a point of light that has been determined to be in the middle of the sailboat 10. Static refers to the fact that the sailboat 10 and its sails are not in use. The loads from those sails produce loads that illustrate that the initial tuning of the mast 101 in the static configuration is only an approximation, which may need to be verified under dynamic loading, as described below. The top of the mast 101 is aligned to that point, and then all interim points along the mast 101, as defined by the user, are brought into alignment.

In some embodiments, with a pre-bend in the mast 101, the laser beam 105 is aimed at the rear face of the mast 101. In order to achieve this, the laser 103 may be set at a sufficient distance from the rear face of the mast 101, as described above. Because lasers 103 are linearly orientated devices, if the laser 103 is positioned too closely to the mast 101, the laser 103 may not be swung, aligned or positioned to target the rear of the mast 101. On the other hand, positioning the laser 103 at a sufficient distance from the mast 101 can aid in accommodating various pre-bent shapes that may be induced to the mast 101. Additionally, positioning the laser 103 away from the mast 101 can provide the user with a greater ease in the adjustments and positioning of the laser 103. Finally, positioning the laser 103 away from the mast 101 can prevent or at least minimize interference between the laser 103 and the main sail.

Referring to FIG. 11, in some embodiments, the laser 103 is rotated upwards to illuminate the backside of the top section 1101 of the mast 101. In some embodiments, the ability to visualize the alignment of the top section 1101 of the mast 101 may be precluded by the sail, the mast 101 itself, or other rigging. To combat these issues, in some embodiments, one or more plates 1105 extend from the top of the mast 101 and include optical targets 110 to assist in visualizing the alignment of the top section of the mast 101.

In some embodiments, the laser 103 is positioned parallel to the mast 101, as shown in FIG. 11. In some embodiments, the laser 103 is mounted to the side of the mast 101 and, by noting the position of the intersection point of the laser line, the laser 103 may generate data regarding the shape and tuning of the mast 101. In some embodiments, the laser 103 is positioned so that the laser beam 105 is perpendicular to the deck 104 of the sailboat 10. In some embodiments, the laser 103 remains in the same position relative to the side to side orientation, and is only moved to adjust the fore and aft position of the laser.

Figure 12D:
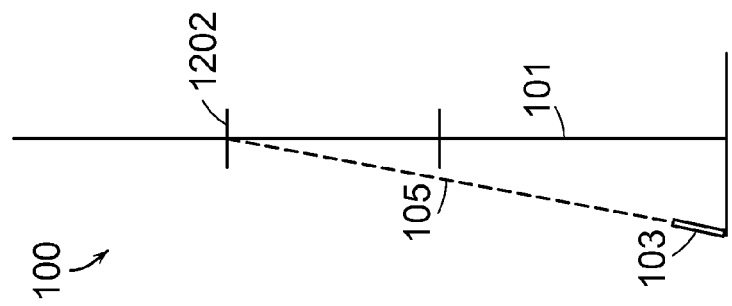
Figure 12C:
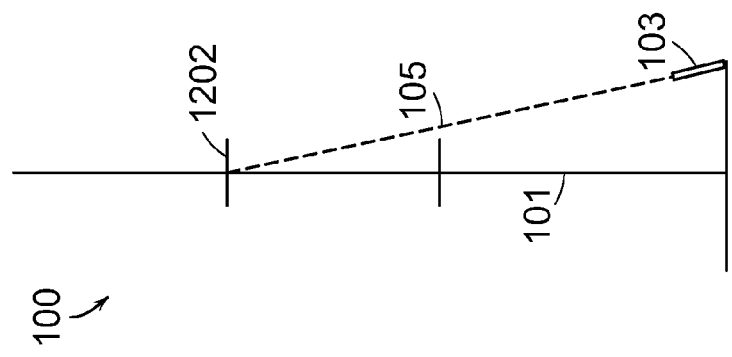
Figure 12B:
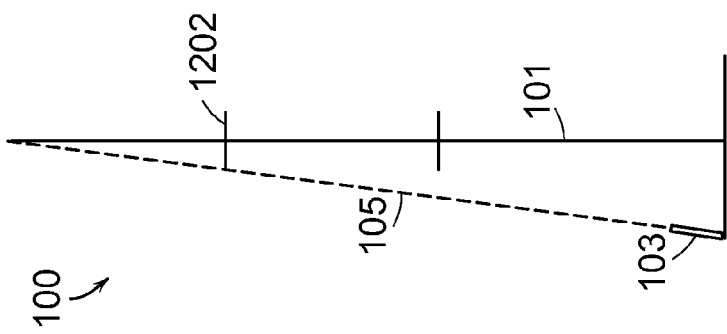
Figure 12A:
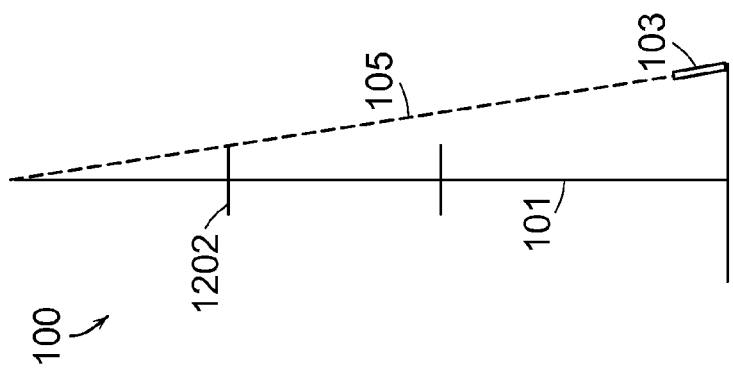

In some embodiments, the laser beam 105 targets the underside of the plate 1105, which may include an optical target 110 or reflective tape. In some embodiments, reflective tapes may be placed on the rear face of the mast 101 at specific points of alignment. In some embodiments, pre-defined tape lengths with defined reflective patterns provide a more exact means of determining the position of the laser illumination point. In some embodiments, the laser beam 105 is perfectly straight and serves as a visual guide for where the top of the mast 101 should be located, or a pre-defined amount of deflection off of that position. In some embodiments, the shrouds are used to bring the tip of the mast 101 in line so that the laser beam 105 targets the underside of the head crane of the mast 101. The mast 101 is thus moved into alignment and position such that the top of the mast 101 intersects the laser illumination position Referring to FIG. 12A and FIG. 12B, in some embodiments, after the top portion of the mast 101 is in line, the laser beam 105 is lowered to the position of the first spreader 1202 to bring a second portion of the mast 101 into alignment using the intermediate or lower shrouds (as shown in FIG. 12C and FIG. 12D). In some embodiments, a vernier screw adjustment is used to adjust the position of the laser light in the athwartship tilted position (side to side). In some embodiments, the laser 103 is adjusted by movement of the vernier to intersect the mast 101 at a position lower on the mast 101. In particular, the laser 103 is adjusted by movement of the vernier to intersect the mast 101 at a position lower on the mast 101. In some embodiments, after the intermediate portion of the mast 101 is in line, the laser beam 105 is further lowered by use of the vernier screw for minor adjustment of the angle. In some embodiments, the angle of the laser beam 105 is significantly adjusted, and then refined through use of the vernier screw. In some embodiments, the laser 103 is adjusted by movement of the vernier to intersect the mast 101 at a position at the next lower set of spreaders down from the top of the mast 101.

In some embodiments, the system for mast alignment of the present disclosure 100 allows the user to quantify the position of the mast head, mast column or both under dynamic loading characteristics. In some embodiments, the mast 101 is aligned under a dynamic loading, i.e. while sailing with the sails hoisted up the mast. In some embodiments, alignment under dynamic tuning is performed with the sails of the sailboat 10 hoisted up the mast 101 and when there is sufficient wind in which to load up the mast 101 and stays. When the mast 101 and stays are dynamically loaded, the user can determine the amount of tensioning that is required to get the mast 101 back into a straight column as would be experienced while the yacht is sailing. The user can also determine what part of the mast 101 is not straight or if the mast 101 deflected more in one direction than the other.

In some embodiments, one or more lasers 103 on a laser track 401 are used in the dynamic tuning of the mast 101. The laser track 401 is placed on the mast 101 to allow the laser 103 to swing about the mast 101, as discussed above. The laser track 401 may be placed anywhere on the mast 101, including on the mast collar 106, as long as the laser beam 105 can be projected, unobstructed, to the upper tip of the mast 101 and other lower points on the mast 101, in a position equally viewed on either side of the mast 101. In some embodiments, the angles of the laser beam 105 to the mast 101 do not need to be the same on both sides. Instead, the vernier can be used to discern the divergence of the mast 101 alignment from a straight column by virtue of the difference of the amount of position that the laser beam 105 marks on the mast 101.

In some embodiments, the base numbers and off-set/pre-bend of the mast 101 are first determined under a static load. The one or more lasers 103 are placed on the mast 101 and the top of the mast 101 is illuminated first on one side and then on the opposite side of the mast 101. The base numbers and off-set/pre-bend of the mast 101 is determined by the differential discerned by the vernier attached to the laser illuminator.

Next, the sail is raised up the mast 101 and the process above is repeated to determine the amount of deflection of the mast 101 on both sides (port and starboard) under a dynamic load. In some embodiments, to determine the deflection of the mast 101 under a dynamic load, the sailboat 10 is sailed in a close-hauled direction on one tack to determine deflection of the mast 101 on that tack. Then the sailboat 10 is turned to the other tack, again in the close-hauled direction, to load the sailboat 10 up and repeat the determination of whether the mast 101 is deflected in that tack.

While sailing, as the sailboat 10 is tacked between port and starboard, the lasers 103 are continually used to ensure that the mast 101 is adjusted as desired. In some embodiments, the mast 101 is adjusted to minimize the difference in deflection from side to side in an attempt to center the mast 101. In some embodiments, if the mast 101 cannot be centered, the mast 101 may be aligned to maintain an even of deflection from side to side.

As described above in connection with mast alignment under a static load, once the top of the mast 101 has been dynamically aligned as desired, a point lower on the mast 101, typically at or around the next lower spreader intersection point, is chosen as the reference point to align a lower section of the mast 101 according to the same process. The process is further repeated until the entire mast 101 is in a desired alignment.

In some embodiments, the combination of illuminating the rear face of the mast 101 at different height points in the static loading, and of sliding the laser from side to side during dynamic loading, and comparing the angles on the vernier, allows for determining the difference between the two loadings towards a refined alignment of the mast 101.

In some embodiments, a system for alignment of a sailboat mast 100 includes a mounting bracket configured for attachment to the mast 101; and one or more lasers 103 pivotally connected to the mounting bracket to enable the one or more lasers 103 to be positioned at an index angle relative to the mast 101 on both sides of the mast 101.

In some embodiments, a system for alignment of a sailboat mast 100 includes a sailboat mast 101 having a bottom end and a top end, a laser 103 mounted to the mast 101 at a first height, a beam splitter mounted at a second height closer to the bottom end of the mast 101 than the first height, the beam splitter is positioned in alignment with the laser 103 to split a laser beam emitted by the laser 103 into multiple beams symmetrical relative to the mast 101.

In some embodiments, a method for alignment of a sailboat mast 100 includes positioning one or more lasers 103 in proximity to a mast 101, providing with the one or more lasers 103 one or more reference beams relative to the mast 101, and aligning the mast 101 according to the reference beams.

All patents, patent applications, and published references cited herein are hereby incorporated by reference in their entirety. While the methods of the present disclosure have been described in connection with the specific embodiments thereof, it will be understood that it is capable of further modification. Furthermore, this application is intended to cover any variations, uses, or adaptations of the methods of the present disclosure, including such departures from the present disclosure as come within known or customary practice in the art to which the methods of the present disclosure pertain, and as fall within the scope of the appended claims.

What is claimed is:

1. A system for alignment comprising:
a sailboat mast extending from a deck of a sailboat;
a mounting bracket detachably engaged to the sailboat mast;
one or more lasers connected to the mounting bracket to be positioned at an index angle relative to the sailboat mast on both sides of the sailboat mast; and
one or more pre-positioned optical targets for the one or more lasers, the one or more optical targets being located on the deck on opposing sides of the mast.

2. The system of claim 1 wherein the mounting bracket is configured to be directly attached to the sailboat mast.

3. The system of claim 1 wherein the one or more lasers are pivotally connected to the mounting bracket.

4. The system of claim 1 further comprising a laser track configured to receive the mounting bracket so that the one or more lasers rotate around the mast along the laser track.

5. The system of claim 4 further comprising a compressive holding plate for attaching the laser track to the sailboat mast.

6. The system of claim 4 further comprising a locking pin for securing the one or more lasers in a location along the laser track.

7. The system of claim 1 wherein one or more bars are disposed on the sailboat mast for attaching the mounting bracket to the sailboat mast.

8. The system of claim 1 further comprising a laser mounting plate for holding the one or more lasers and pivotally attached to the mounting bracket for adjusting the index angle.

9. The system of claim 1 further comprising a vernier for fine tuning the index angle.

10. The system of claim 1 wherein the one or more lasers are configured to project one or more laser beams onto the one or more pre-positioned optical targets.

11. A system for alignment comprising:
a sailboat mast installed in a sailboat;
a mounting bracket detachably engaged to the sailboat mast;
one or more lasers connected to the mounting bracket to be positioned at an index angle relative to the sailboat mast on both sides of the sailboat mast; and
one or more pre-positioned optical targets for the one or more lasers.

12. The system of claim 11 wherein the mounting bracket is configured to be directly attached to the sailboat mast.

13. The system of claim 11 wherein the one or more lasers are pivotally connected to the mounting bracket.

14. The system of claim 11 further comprising a laser track configured to receive the mounting bracket so that the one or more lasers rotate around the mast along the laser track.

15. The system of claim 11 wherein one or more bars are disposed on the sailboat mast for attaching the mounting bracket to the sailboat mast.

16. The system of claim 11 further comprising a laser mounting plate for holding the one or more lasers and pivotally attached to the mounting bracket for adjusting the index angle.

17. The system of claim 11 further comprising a vernier for fine tuning the index angle.

18. The system of claim 11 wherein the one or more lasers are configured to project one or more laser beams onto the one or more pre-positioned optical targets.

19. A method for alignment comprising:
installing a sailboat mast in a sailboat;
engaging one or more lasers to the sailboat mast;
positioning one or more optical targets on each side of the sailboat mast;
providing with the one or more lasers one or more reference beams onto at least one of the one or more optical targets at an index angle relative to the sailboat mast; and
adjusting the sailboat mast until the laser beams on each side of the sailboat mast intersect the corresponding optical target to align the sailboat mast according to the reference beams.

20. The method of claim 19 wherein the one or more optical targets comprises multiple optical targets positioned at an equal distance from the sailboat mast.

* * * * *